3,156,213
MOBILE CONTAINER FOR CARRYING AND
ACCOMMODATING DOMESTIC ANIMALS
Julius Patten, Vogelsanger Weg 35,
Cologne-Junkersdorf, Germany
Filed July 5, 1962, Ser. No. 207,492
Claims priority, application Germany July 7, 1961
11 Claims. (Cl. 119—19)

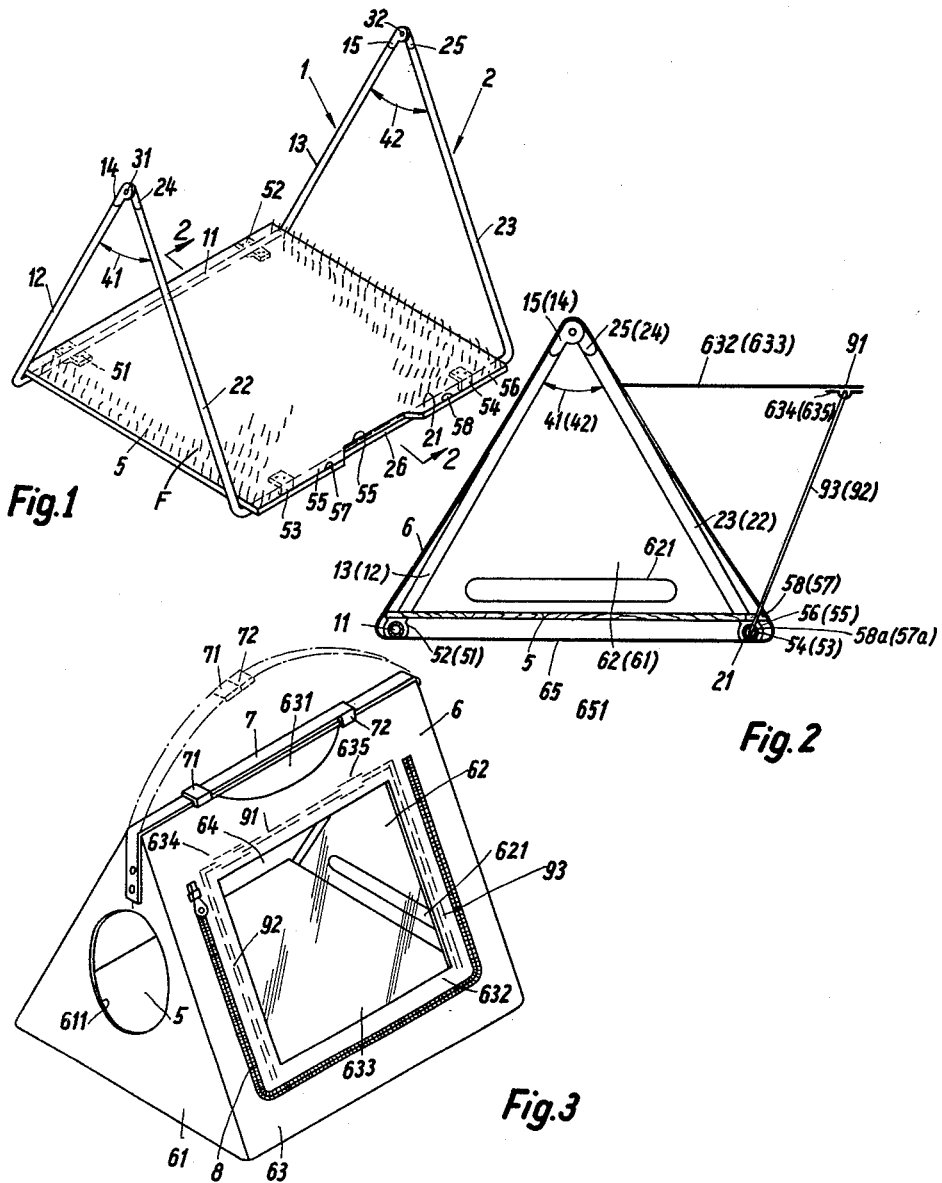

The present invention relates to a mobile container for carrying and for accommodating and keeping domestic animals, particularly dogs.

It is known that keepers of animals experience great difficulties in carrying and accommodating domestic animals when the animal must be carried from one place to another and/or accommodated outside the home. When they are carried in rail-borne or motor vehicles, the animals running around tend to molest the occupants of the vehicle and will endanger the safety of traffic if they disturb the driver in driving the vehicle. It is also difficult to accommodate animals in or near tents. The animals do not have a fixed place for rest and sleep so that they are restless and molest those around them.

It is an object of the present invention to eliminate these difficulties.

A mobile container for carrying and accommodating domestic animals, particularly dogs, is characterized according to the invention that it comprises as main components a collapsible carrying frame, a bottom plate which can be located at said frame, and a covering of foldable materials for the carrying frame. A container of this design can be collapsed to a flat shape, similar to a tray, whereas in condition for use the container is highly stable and can meet the requirements of the animal to a large extent. As a result, the animal will be quiet and will not molest those around it.

Collapsible containers are known per se. They consist of crates of laths, which can be assembled to form the container and can be collapsed. Whereas this meets the requirement of accommodating the container within a very small space when the container is not used, such crates have an extremely unsightly appearance. The animal itself is kept as in a cage so that it does not feel comfortable and expresses this condition by barking or another behavior which disturbs those around it. With the design proposed according to the invention, however, the container can be given a pleasing appearance. The bottom plate assumes soon the odor of the animal so that the same becomes accustomed to staying in the container and uses it as a well-known place for resting and sleeping without perceptible molestation of those around it. In addition, by the measures which will be explained in detail hereinafter, the container can be given the appearance of a kennel, which is considered by the animal as providing protection and safety.

A particularly simple embodiment of the container will be obtained if the carrying frame has preferably U-shaped tubular frames, whose initially free limbs are articulated at their ends so that the angle included by the center planes of the frames can be increased from zero, when the frames are collapsed, to 60° and more so as to arrange the planes of the tubular frames in the configuration of a parallel prism. If the bottom plate, which is to be secured to the cross-pieces of the frames, has clips, particularly resilient clips, by which the bottom plate can be clamped to the cross-pieces in position for use, the frames will be locked relative to each other in a position in which their planes define a prism of triangular cross-section so that in conjunction with the U-shape of the frames and the articulations at the ends of the initially free limbs of the U-shapes the container will form a stable structure in position for use.

The covering may be provided in accordance with the requirements of the animal, particularly by the provision of openings, which can be closed, for replacing food and water or to enable the animal to stick out its head. Whereas the animal cannot leave the container, e.g., while traveling in a motor vehicle or rail-borne vehicle, it is not disturbed in its freedom of movement, particularly in watching outside occurrences, so that it feels comfortable but cannot molest the occupants of the vehicle.

When a suitably transparent part of the covering is adapted to be folded outwardly (means may be provided to maintain this part in its outwardly folded condition), the container is given the above-mentioned appearance of a kennel. Being covered upwardly by the top part of the container and by the part folded outwardly, the animal feels safe and behaves quietly.

Carrying means are suitably provided for carrying the container in collapsed condition and in condition for use. These carrying means are desirably designed to limit the freedom of movement of the animal as far as this appears necessary.

An illustrative embodiment of the invention is shown on the drawing.

FIG. 1 is a perspective view showing the carrying frame and the baseplate without covering.

FIG. 2 is a vertical central sectional view taken along line 2—2 of FIG. 1, drawn to an enlarged scale and showing the frame, provided with a covering, in position for use.

FIG. 3 is another perspective view showing the container as viewed from the outside.

It is apparent from the drawings that one of the main components of the container consists of a prismatic carrying frame consisting of tubular frame members 1 and 2. Both tubular frame members are U-shaped and have cross-pieces or connecting portions 11 and 21 and, considered individually, the initially free limbs or legs 12, 13 and 22, 23. The ends of these limbs are articulated together. For this purpose the end 14 of the limb 12, the end 15 of the limb 13, the end 24 of the limb 22 and the end 25 of the limb 23 are flattened and passed through by pivot pins 31, 32. Hence, the tubular frame members 1, 2 can be relatively rotated to cause the limbs 12, 22 and 13, 23 to contact each other so that the angles 41, 42 included by the limbs 12, 22 and 13, 23 equal zero. In position for use, however, the angles 41, 42 have the value apparent from the drawing, for instance, 60° or more or less.

A bottom plate 5 is also provided. This bottom plate may consist of a separate part, i.e., it need not be pivotally movable about the cross-pieces 11 or 21 of the U-shaped frame members. In this case the bottom plate 5 is suitably provided on the underside with some resilient clips, at least two, if they are diagonally opposed. It is more desirable, however, to provide three or four clips because this will increase the stability of the container.

The illustrative embodiment has a bottom plate 5 which is pivotally movable about the cross-piece 11. For this reason two spring clips 53 and 54 are provided, by means of which the bottom plate 5 can be clamped at one side to the cross-piece 21 of the frames 1, 2 by half-joints 51, 52, such as screw-connected straps conforming to the cross-section of the tube 11 and surrounding the latter are provided at the opposite side of plate 5. In this case the bottom plate can be folded into the area defined by the tubes 11–13 so that the collapsibility of the container will not be adversely affected. The bottom plate 5 has suitably a cut-out portion 55 to expose the portion 26 of the tube 21 so that the tube can be gripped at 26 with one hand whereas the other hand takes hold of one of the protruding portions 55, 56 of the bottom plate 5. The clips 53, 54 can then be stripped from the tube 21 without difficulty.

The tubular frame members 1, 2 consist suitably of thin-walled tubes bent to appropriate shape, preferably of light metal, light-gauge sheet steel, or plastic unless wood, wickers, pressed woodfiber or other materials are to be used, in which case the frames consist suitably of solid sections. The bottom plate may preferably consist of plywood, which may have a coating of plastic. This coating of plastic is suitably flocked with flocking F on the side facing into the container so that mats, pads, mattress-like layers or other layers cushioning the animal against shocks of the vehicle cannot slip as on a smooth plate 5.

The base frame shown in FIG. 1 carries a covering 6, which is closed by being sewn together in the present case. The covering may consist of various textile fabrics, such as canvas, impregnated, moisture-impermeable fabrics, plastic sheeting, coated or uncoated, and other materials. It is also possible to use discardable paper coverings. Hence, the covering 6 comprises the triangular end panels 61, 62, the rectangular side panels 63, 64, and the bottom panel 65, which is not essential since obviously the bottom edge of side panels 63, 64 could be fastened directly to the side edges of the bottom plate 5. FIG. 3 shows that the side panel 62 has a slot 621, through which plates with food, or water bowls or the like can be pushed. The end panel 61 has an opening 611, through which the animal can stick out its head and watch its environment if it is to be permitted to do so. An opening 631 may also be provided in the top portion of the panel 63 of the covering. In this case the carrying strap 7, which is shortened with the aid of the loops 71, 72 in the position shown in solid lines, is moved into the position shown in dotted lines. Through the opening 631 and a corresponding opening 641, not shown, in the opposite panel 64 of the covering 6, a portion of the hand can be passed for conveniently gripping and carrying the container when the straps 7 cannot be extended. A slide fastener 8 defines in the panel a tongue-shaped part 632, which contains the transparent area 633 consisting, e.g., of polymethacrylic esters. Through the transparent area 633 the animal can be watched while it is being carried and the animal can watch the environment. The slide fastener 8 enables the parts 632, 621 to be folded upwardly as is shown in FIG. 2. Straps 634, 635 fixed to part 632 in any known manner serve for locating the cross-piece 91 of a U-shaped wire member having free limbs 92, 93, which can be positioned as shown in FIG. 2. Through openings 57, 58 in the bottom plate 5 in the limbs 92, 93 can be fitted into and located at further openings 57a, 58a in the tube 21 so that the tongue 632, 633 will be maintained in the position shown in FIG. 2. The container is thus converted to a kennellike structure and can be placed in this condition in or before a tent so that the animal is protected from the inclemencies of the weather.

In view of the nature of the invention the illustrative embodiment cannot even approximately show all existing possibilities. These are only partly embodied in the illustrative embodiment and the use of other possibilities is not excluded.

What I claim is:

1. A container for carrying and accommodating domestic animals comprising, in combination, a foldable prismatic carrying frame formed by a plurality of rigid frame members hinged along at least one edge of said prismatic frame to each other so as to be foldable between a spread position for use and a collapsed position in which said frame members are abutting against each other in substantially parallel relationship, each of said frame members having an elongated portion extending longitudinally of said carrying frame and said elongated portions of said frame members extending parallel to each other; a rigid bottom plate having longitudinal edges extending parallel to said elongated portions of said frame members; hinge means for hingedly connecting said bottom plate along one of the longitudinal edges thereof to the elongated portion of one of said frame members; releasable fastening means for releasably connecting said bottom plate along the other longitudinal edge thereof to the longitudinal portion of another of said frame members to releasably maintain thereby said carrying frame in said spread position; and a covering of flexible material enclosing said carrying frame in said spread position for use.

2. A container for carrying and accommodating domestic animals comprising, in combination, a foldable prismatic carrying frame formed by a pair of substantially rigid U-shaped frame members having each a pair of substantially parallel leg portions and an elongated connecting portion extending in longitudinal direction of said carrying frame, the free ends of the leg portions of one frame member being hingedly connected to the free ends of the leg portions of the other frame member so that said frame members are movable between a spread position for use in which the hinged leg portions of the pair of frame members include an angle of substantially 60° and a collapsed position in which said frame members are abutting against each other in substantially parallel relationship; a rigid bottom plate having longitudinal edges extending parallel to said elongated connecting portions of said frame members; hinge means for a hingedly connecting said bottom plate along one of the longitudinal edges thereof to the elongated connecting portion of one of said frame members; releasable fastening means for releasably connecting said bottom plate along the other longitudinal edge thereof to the longitudinal connecting portion of the other of said frame in said spread position; and a covering of flexible material enclosing said carrying frame in said spread position for use.

3. A container as set forth in claim 2 in which said frame members are formed from U-shaped tubes.

4. A container as set forth in claim 2 in which said frame members are formed from U-shaped rods.

5. A container as set forth in claim 2 in which said releasable fastening means are formed by spring clips.

6. A container as set forth in claim 2 in which said covering is formed with an opening permitting an animal in said container to put its head therethrough.

7. A container as set forth in claim 2 in which said covering is formed in the plane of one of said frame members with a flap adapted to be tilted out of said plane and including a slide-fastener for securing the edges of said flap to the remainder of said covering.

8. A container as set forth in claim 7 and including means connected to said container for holding said flap in tilted position.

9. A container as set forth in claim 7 in which said flap is formed from transparent material.

10. A container as set forth in claim 2 and including handle means connected to said container for carrying the same.

11. A container as set forth in claim 2 in which said covering is formed with gripping passage, and handle means in form of extendable straps connected to said container for carrying the same, said straps extending over said gripping passage.

References Cited in the file of this patent

UNITED STATES PATENTS

| | | |
|---|---|---|
| 984,977 | Stokes | Feb. 21, 1911 |
| 1,635,942 | Knudsen | July 12, 1927 |
| 2,170,379 | Ortt | Aug. 22, 1939 |
| 2,538,778 | Halpin | Jan. 23, 1951 |
| 3,043,264 | Fehofer et al. | July 10, 1962 |